April 8, 1969    M. E. GRIMES    3,436,847
V-SHAPED SNOWPLOW FOR ATTACHMENT TO GARDEN TRACTORS
Filed Sept. 6, 1966    Sheet 1 of 2

INVENTOR.
MARION E. GRIMES
BY Kimmel, Crowell & Weaver
ATTORNEYS.

April 8, 1969

M. E. GRIMES 3,436,847

V-SHAPED SNOWPLOW FOR ATTACHMENT TO GARDEN TRACTORS

Filed Sept. 6, 1966

INVENTOR.
MARION E. GRIMES

BY *Kimmel, Crowell & Weaver*

ATTORNEYS.

United States Patent Office 3,436,847
Patented Apr. 8, 1969

3,436,847
V-SHAPED SNOWPLOW FOR ATTACHMENT TO GARDEN TRACTORS
Marion E. Grimes, 738 N. Ohio St.,
Greenville, Ohio 45331
Filed Sept. 6, 1966, Ser. No. 577,239
Int. Cl. E01h 5/04; A01b 59/048
U.S. Cl. 37—44                                2 Claims

ABSTRACT OF THE DISCLOSURE

A V-shaped snowplow for attachment to garden tractors with the plow being completely demountable for shipping and storage. The plow blade is adjustable in height and has the center and outer ends of the blade supported on ground engaging shoes which are also vertically adjustably secured to the blade.

---

This invention relates to a snowplow attachment for tractors. More specifically, this invention relates to a snowplow assembly which is easily attached to a riding garden tractor and which is easily disassembled for purposes of shipment or for storage during seasons of nonuse.

An object of this invention is to provide a snowplow blade and assembly which may easily be attached to a tractor for the removal of snow and which is easily detached from the tractor during seasons of nonuse for snow removal.

A further object of this invention is to provide a snowplow assembly which may easily be assembled and attached to a tractor during the winter season for the removal of snow from streets, sidewalks and driveways and which may easily be detached from the tractor and disassembled for storage during seasons of nonuse.

A further object of this invention is to provide a snowplow assembly which may be disassembled easily for shipment.

Figure 9:
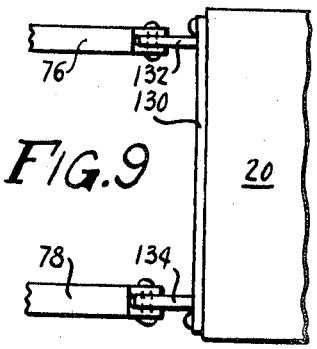
Figure 10:
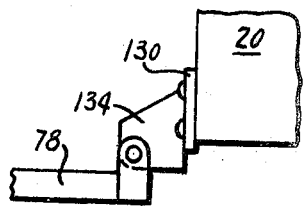

FIGURES 9 and 10, respectively, are top and side views of yet another means for attaching the assembly to a tractor.

Figure 11:
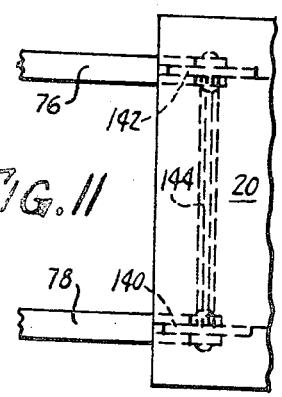
Figure 12:
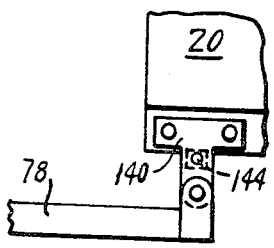

FIGURES 11 and 12, respectively, are top and side views of still another means for attaching the snowplow assembly to a tractor.

Figure 13:
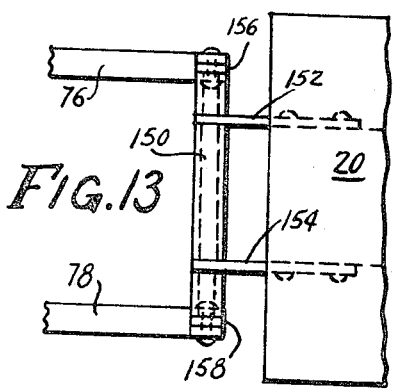
Figure 14:
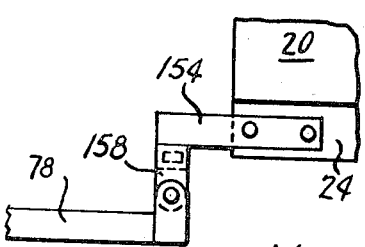

FIGURES 13 and 14 are top and side views, respectively, of still an additional means of attaching the snowplow assembly to a tractor.

Figure 1:
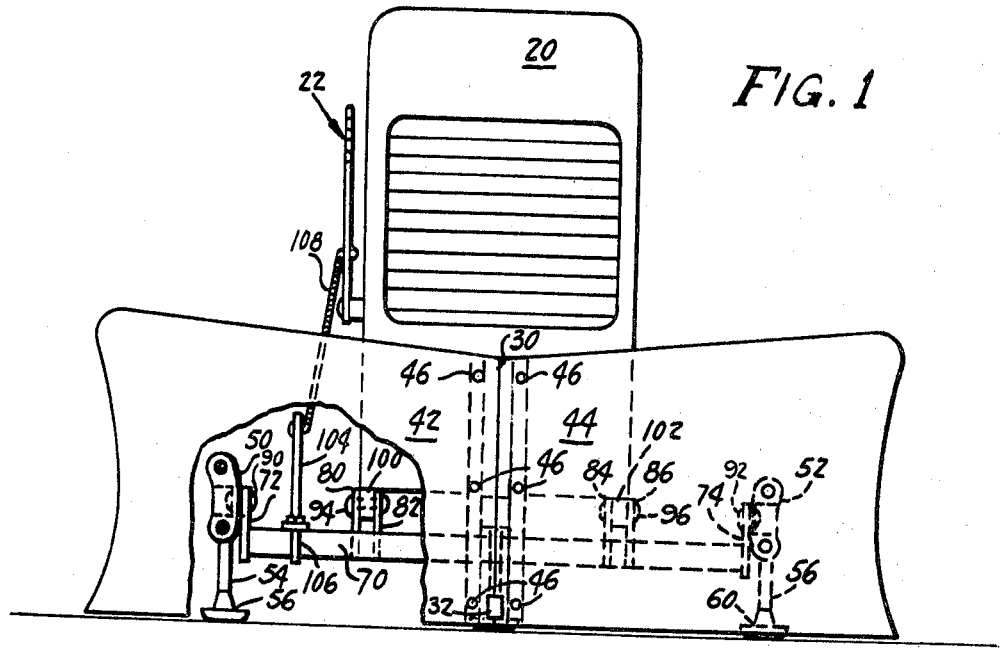
FIGURE 1 is a front view of the snowplow assembly attached to a tractor, only part of which tractor is shown.
Figures 2, 4:
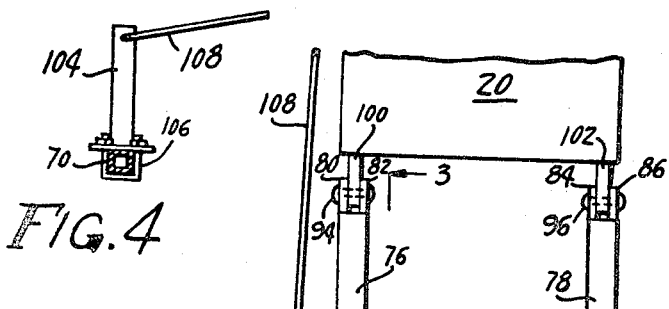
FIGURE 2 is a top view of the snowplow assembly attached to a tractor.
FIGURE 4 is a detail of the operating arm which is secured to the hitch assembly interconnecting the snowplow blade and the tractor.
Figure 3:
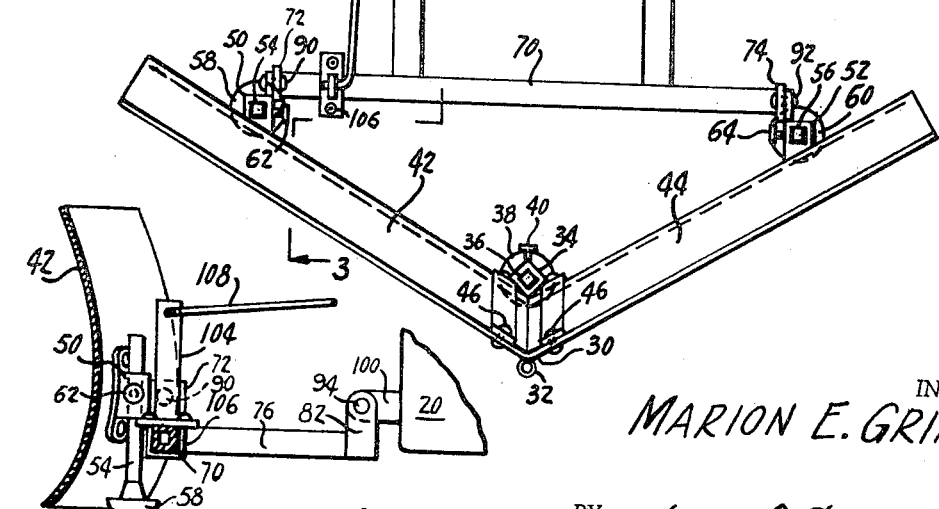
FIGURE 3 is a side view of the snowplow assembly taken substantially along line 3—3.
Figure 8:
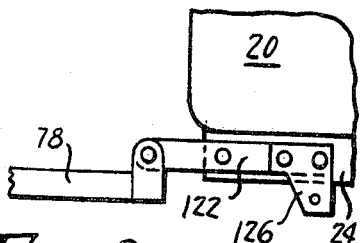

Referring now to FIGURE 1, a tractor 20 is shown having an operating lever 22 and frame members 24 as best shown in FIGURES 8 and 14.

The blade assembly is made up of an elongate blade center element 30 which may have secured to the front point thereof near the bottom of the blade center element a ring member 32 and to the rear of the blade center element 30 a bracket 34 for slidably receiving a vertical leg member 36 to the bottom of which is secured a foot 38. The position of the slidably mounted leg 36 in the bracket 34 may be fixed by means of a thumbscrew member 40. The blade assembly also includes blade members 42 and 44 which are joined to the blade center element 30 by frictional fastening means 46 to form essentially smooth intersecting concave surfaces in the form of a V. Extending from the rear surfaces of the blade members 42 and 44 are brackets 50 and 52 which may slidably receive vertical leg members 54 and 56 having feet 58 and 60 respectively on the bottom thereof. The position of the slidable leg members 54 and 56 may be fixed by means of thumbscrew members 62 and 64.

Interconnecting brackets 50 and 52 is a strut 70 having projections 72 and 74 extending upwardly therefrom and beams 76 and 78 extending rearwardly therefrom. Beam 76 has upwardly projecting arms 80 and 82 and beam 78 has upwardly projecting arms 84 and 86 at the rearwardmost end of the beam members. Strut 70 is pivotally connected to brackets 50 and 52 by bolts 90 and 92 and beams 76 and 78 are pivotally connected to brackets 100 and 102 by bolts 94 and 96 which extend through apertures formed in arms 80, 82, 84 and 86.

An operating arm 104 extends upwardly from strut 70 and is secured to strut 70 by U-bolt 106. An operating lever or cable 108 extends from operating arm 104 on the hitch assembly to lever 22 on the tractor.

In operation, when the hitch assembly is attached to the tractor by means of brackets 100 and 102 and the tractor is caused to move forward, a force is exerted through beam members 76 and 78 on strut 70 and to the blade members 42 and 44 through brackets 50 and 52. The blade may be maintained at any desired distance above the surface from which the snow is to be removed by adjusting the slidably received legs 36, 54 and 56 in brackets 34 and 50 and 52, and affixing their position by thumbscrews 40, 62 and 64. It is also possible to cause the blade to be raised or lowered by means of lever 22 acting through the cable or rod 108 which causes the hitch assembly and blade to pivot about bolts 94 and 96. In addition, the blade assembly may pivot about bolts 90 and 92 to a limited extent thereby maintaining the blade assembly in a substantially perpendicular position as the hitch assembly pivots about bolts 94 and 96.

It is to be realized that the method of attaching the snowplow assembly to a tractor depends upon the structure of the particular tractor to which it is desired to attach the snowplow assembly. Therefore, the mounting bracket may take several different forms depending upon the type of tractor with which the snowplow was intended for use. FIGURE 5 through 14 show various forms which the bracket may take.

Figure 5:
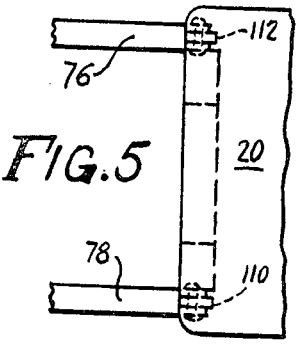
FIGURES 5 and 6 are top and side views, respectively, of one means for attaching the snowplow assembly to a tractor.
Figure 6:
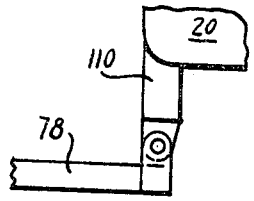

As shown in FIGURES 5 and 6, the bracket may take the form of two downwardly extending members 110, 112 having an aperture formed therein.

Figure 7:
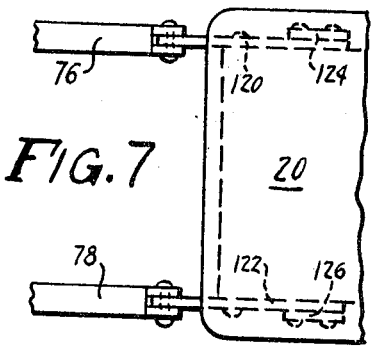
FIGURES 7 and 8 are top and side views, respectively, of a second means for attaching the snowplow assembly to a tractor.

As shown in FIGURES 7 and 8, the bracket may take the form of forwardly extending members 120 and 122 and downwardly extending members 124 and 126.

In another embodiment the bracket may take the form of a plate 130 having members 132 and 134 extending forwardly and downwardly.

In FIGURE 11 and FIGURE 12, the brackets are shown in the form of T-shaped members 140 and 142 being held together by bolt 144.

In the embodiment shown in FIGURES 13 and 14, the bracket takes the form of a cross-beam 150 having rearwardly extending members 152 and 154 and downwardly extending members 156 and 158 at the ends of cross-beam 150.

It will be realized from the above examples that the invention may be embodied in many forms of which the above are only exemplary. It is known in the prior art to use V-shaped blades for the purpose of snow removal; however, the use of V-shaped blades presents many problems especially with respect to packaging and shipment of snowplow assemblies by the manufacturer.

In addition to difficulties in packaging and shipping blades having a V-shaped, there is the inconvenience of storing the snowplow assembly during the summer months when it is not needed.

The invention described herein overcomes many of the problems of shipment and storage. The snowplow assembly can readily be assembled for use and disassembled for storage or for shipment. The V-shaped blade may be disassembled into three components and be packed conveniently with the hitch assembly.

In addition to being readily disassemblable, the snowplow attachment is light, sturdy and versatile. It will be apparent from the foregoing and from the drawings that the readily disassemblable snowplow described herein has many advantages over the prior art.

I claim:
1. A V-shaped snowplow assembly which is selectively assembled for attachment to and use with a garden tractor and easily disassemblable for convenient shipping and storage during seasons of non-use comprising
   first and second elongate blade members which are substantially rectilinear along their major axes and arcuately formed in cross-section thereby forming a concave surface,
   means joining the blade members to form a generally V-shaped plow blade having a concave front surface,
   a pair of brackets extending from the rear surface at the divergent ends of said first and second blade members,
   a single bracket secured to the rear surface of said plow blade intermediate the outer ends thereof,
   a leg vertically slidably mounted in each of said brackets,
   a set screw in each bracket for releasably clamping said leg in vertically adjusted position therein,
   a foot pad on the lower end of each of said legs for engagement with the surface to be cleared, and
   a hitch assembly for attaching the V-shaped plow blade to a tractor comprising
   a strut extending between the pair of brackets for rigidly fixing the blade assembly in the shape of a V,
   means demountably pivotally connecting the opposite ends of said strut to a respective one of said pair of brackets,
   first and second beam members extending rearwardly from the strut in spaced apart parallel relationship,
   arms projecting upwardly from the rear ends of the beam members, each of said arms having an aperture therein,
   mounting brackets for attachment to a tractor and for connection with the arms,
   means pivotally connecting the mounting brackets to the upwardly projecting arms for transmitting a force to the V-shaped plow blade,
   an operating arm extending upwardly from and demountably secured to the strut in proximity to one end of the strut, and
   hand actuated means extending from the operating arm for attachment to a tractor for moving the V-shaped plow blade about the pivotal connection between the rearwardly extending beams and the mounting brackets, said V-shaped plow blade being freely movable about the demountable pivot means to maintain the lower edge of said plow blade generally parallel to the surface to be cleared.

2. The snowplow assembly of claim 1 in which said hand actuated means comprises a lever pivotally mounted on said tractor and a link extending between said lever and the upper end of said operating arm and pivotally secured to each.

References Cited
UNITED STATES PATENTS

| 1,218,075 | 3/1917 | Ganung | 37—44 |
| 1,365,153 | 1/1921 | Clark | 37—44 |
| 1,483,247 | 2/1924 | Rowe | 37—44 |
| 1,500,671 | 7/1924 | Conover | 37—44 |
| 1,550,574 | 8/1925 | Sargent | 37—44 |
| 1,704,923 | 3/1929 | Pellette | 37—44 |
| 1,708,042 | 4/1929 | Abbe | 37—44 |
| 2,440,166 | 4/1948 | Bourne et al. | 37—44 |

ROBERT E. PULFREY, Primary Examiner.

EUGENE H. EICKHOLT, Assistant Examiner.

U.S. Cl. X.R.

172—276